W. E. MARTIN.
MOWING MACHINE.
APPLICATION FILED OCT. 29, 1909.
1,027,745.
Patented May 28, 1912.
5 SHEETS—SHEET 1.
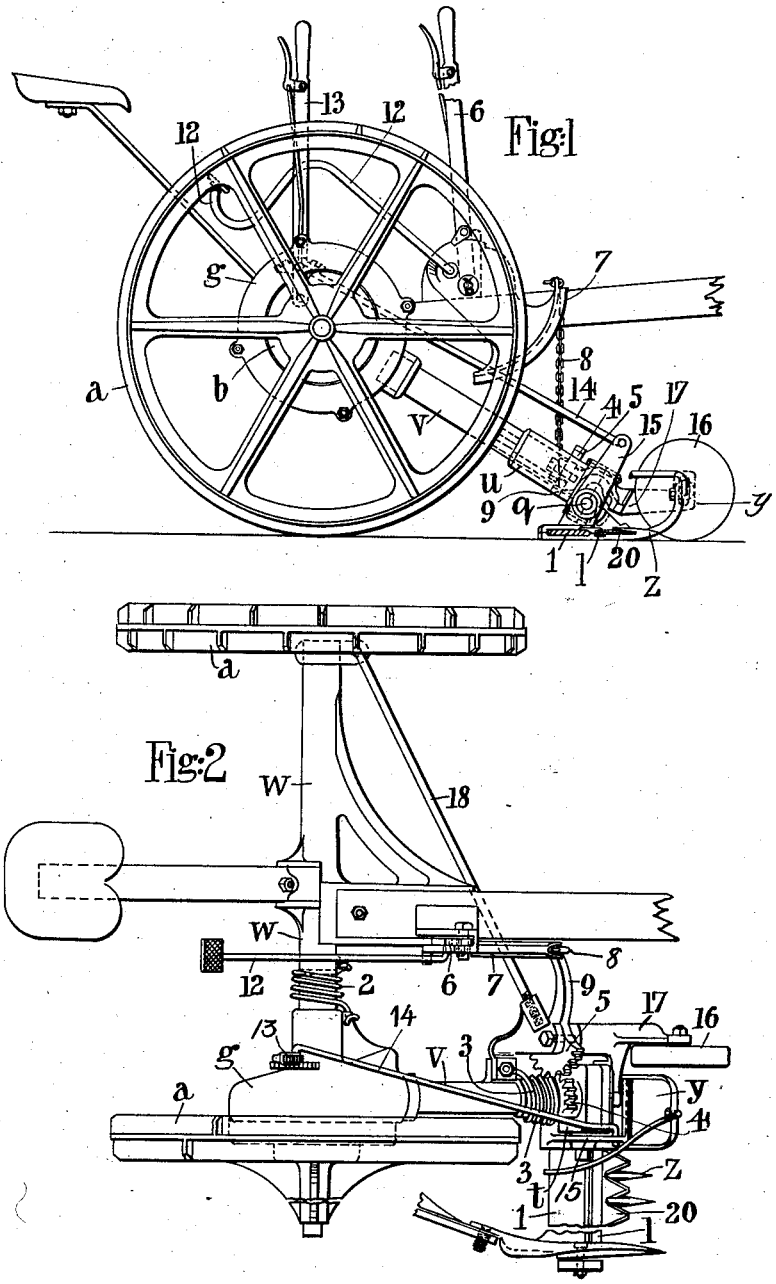
Witnesses
H. A. Knight
Ray J. Ernst.
Inventor
William Edward Martin
by
his attorneys

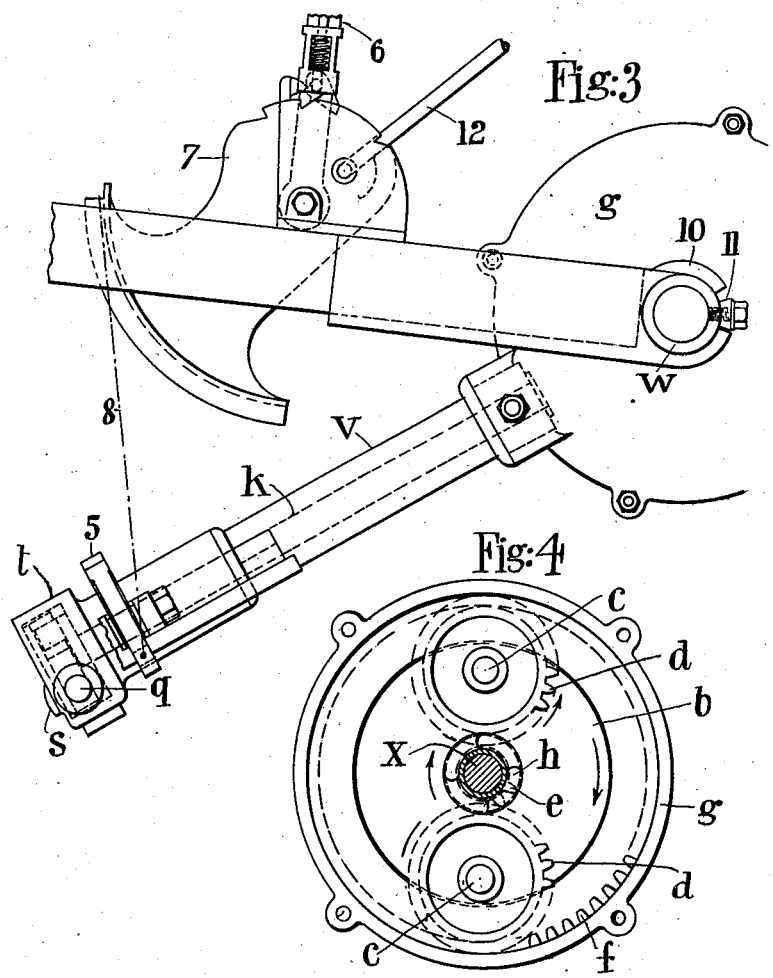

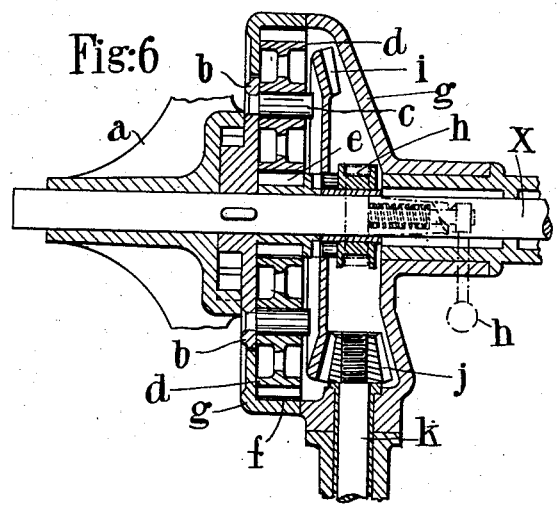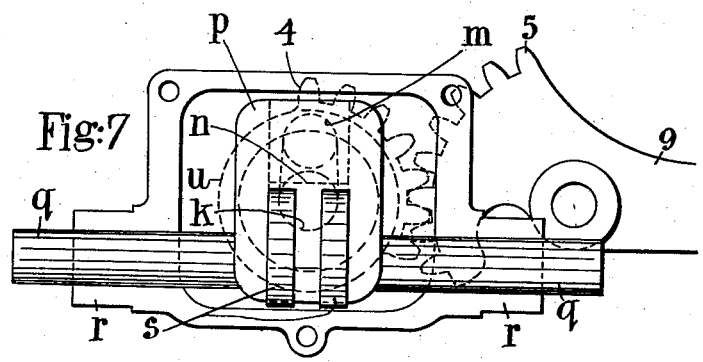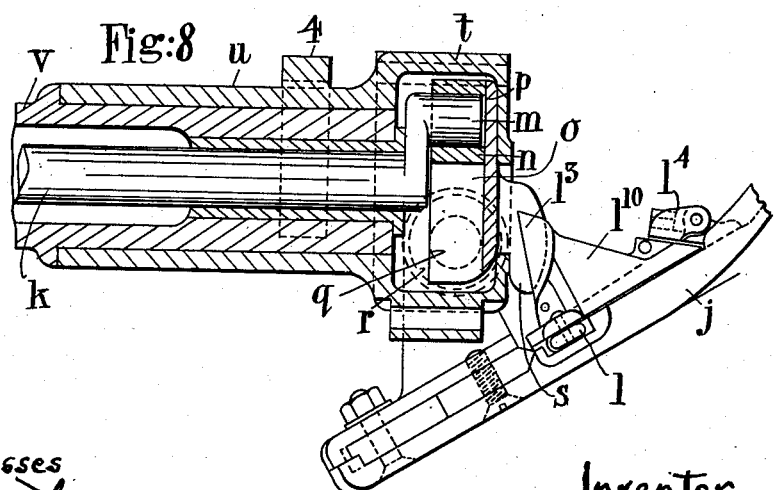

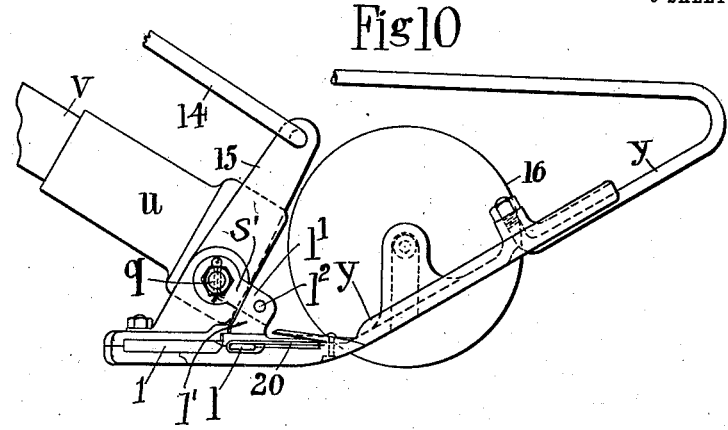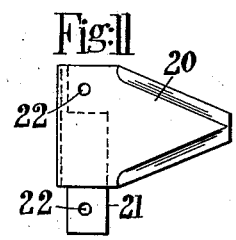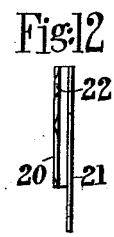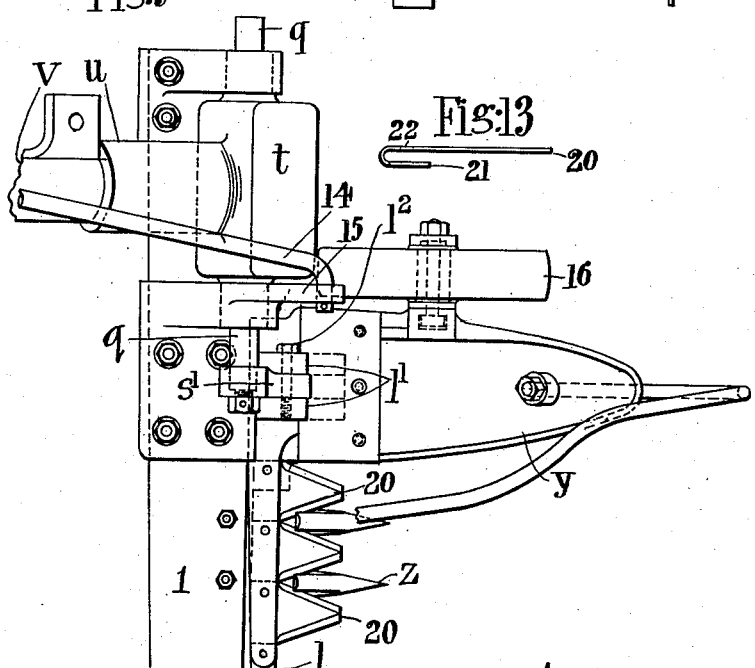

W. E. MARTIN.
MOWING MACHINE.
APPLICATION FILED OCT. 29, 1909.
1,027,745.
Patented May 28, 1912.
5 SHEETS—SHEET 5.
Fig:14
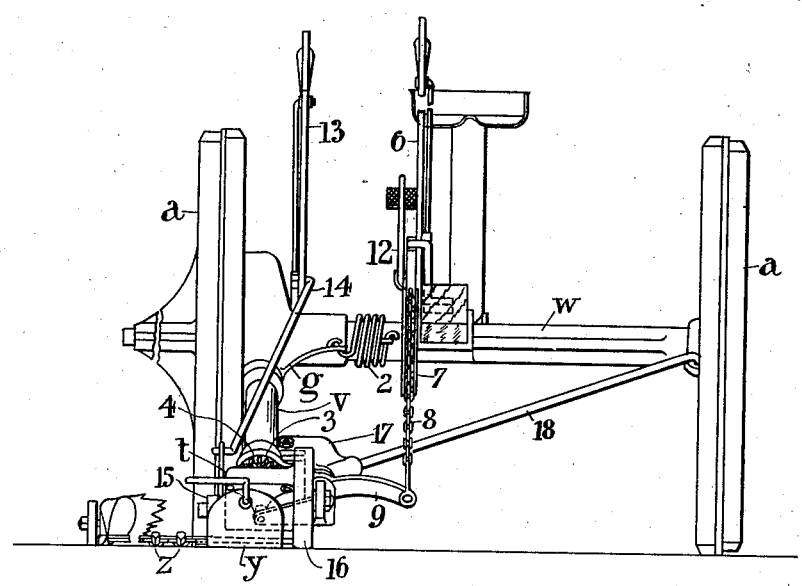
Fig:15.
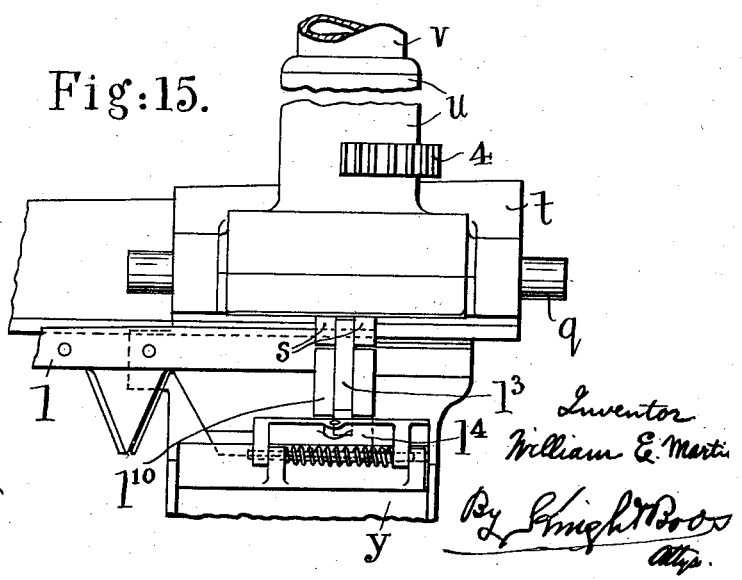
Witnesses:—
Elsie Swenson
Clara Hohenstein
Inventor
William E. Martin
By Knight Bros
Attys.

UNITED STATES PATENT OFFICE.

WILLIAM E. MARTIN, OF STAMFORD, ENGLAND.

MOWING-MACHINE.

1,027,745.   Specification of Letters Patent.   Patented May 28, 1912.

Application filed October 29, 1909. Serial No. 525,361.

*To all whom it may concern:*

Be it known that I, WILLIAM EDWARD MARTIN, a subject of the King of Great Britain, residing at Stamford, in the county of Lincoln, England, have invented new and useful Improvements in Mowing-Machines, of which the following is a specification.

The objects of the present invention are as follows:—1. To construct an improved form of machine which is able to withstand the stresses to which such machines are subjected without causing unnecessary friction on the main axle. 2. To provide improved driving mechanism for the knife bar and improved means for connecting the knife bar to the slide by which it is driven. 3. To provide improved means for adjusting the position of the finger bar and knives. 4. To provide improved means for supporting the finger bar and knives whereby they are caused to "float" at about the level of the ground and may be more readily raised or lowered. 5. To provide improved knife sections which will prevent wear on the knife bar, strengthen same and afford facilities for repairs.

The invention is illustrated in the accompanying drawings, in which—
Figure 1 is a side elevation of a mower, and Fig. 2 is a plan of the same. Fig. 3 is a side elevation of certain parts of the machine seen from the opposite side to that represented at Fig. 1, and drawn to an enlarged scale, showing the raising mechanism. Fig. 4 is a side elevation of the gear box with the cover removed. Fig. 5 is a side elevation of the clutch by which the main wheel gives motion to the knife bar.
Fig. 6 is a section showing the gear box, gearing and some parts connected therewith. Fig. 7 is a front view of the slide box and mechanism for giving motion to the knife bar. Fig. 8 is a section through the sleeve carrying the slide box shown in Fig. 7. Fig. 9 is a plan of one of the shoes, part of the knife, and other adjacent parts of different construction to those shown in Figs. 2, 3, 7 and 8. Fig. 10 is a side elevation of the parts shown in Fig. 9. Figs. 11, 12 and 13 are respectively a plan, front elevation, and side elevation of one section of the knife. Fig. 14 is a front elevation of the machine, part of the knife being broken away. Fig. 15 is a plan of the shoe shown in Fig. 8 and means for connecting the knife bar to the driving lugs.

$a$, $a$, are the driving and carrying wheels of the machine, one of which gives motion to the disk $b$ fixed on the main shaft $x$ by clutch mechanism such as is clearly shown in Fig. 5. This disk carries pins $c$, on which are mounted planet pinions $d$ gearing with the sun pinion $e$ and also gearing with an internally toothed ring $f$ forming part of a gear case $g$. The planet pinions $d$ give motion to the sun pinion $e$, which latter, by means of a clutch $h$, gives motion to the bevel wheel $i$ which drives a bevel pinion $j$ on the shaft $k$ employed for giving motion to the knife bar $l$.

According to the construction shown in Figs. 7 and 8, the shaft $k$ is provided at its lower end with a crank $m$ on which is a block $n$ working in a transverse slot $o$, in an enlargement $p$ connecting the two parts of the bar $q$, which slides in guides $r$. This slide bar $q$ has two lugs $s$ carried by the enlargement $p$ by means of which the knife bar is connected to the slide bar.

The bearings or guides $r$ are carried by a box $t$ on the back of which is formed or fixed a sleeve $u$ which is carried by the casing or bearing $v$ of the shaft $k$. The bearing $v$ is carried at its upper end by the casing $g$, which is mounted on and is concentric with a sleeve $w$ surrounding the main shaft $x$, and is capable of being rotated partly around the same. On the exterior of the bearing $r$ carried by the slide box $t$, is pivoted the inner shoe $y$, to which the knife bar $l$ is attached, and this latter therefore moves concentrically with respect to the slide bar $q$. The knife bar $l$, finger bar 1, and inner shoe $y$ are thus mounted on a universal joint owing to the combined motion of the sleeve $u$ on the bearing $v$ and of the shoe $y$ on the exterior of the bearings $r$.

To the gear case $g$ is attached one end of a coiled spring 2 surrounding the sleeve $w$. The other end of the spring 2 is attached to the sleeve $w$. This spring 2 tends to rotate the gear case $g$ around the sleeve $w$, and consequently tends to raise the knife bar $l$, finger bar 1, shoe $y$, and slide box $t$ off the ground. The spring 2 thus lessens the weight when these parts are lifted, and it also causes the knife bar $l$ and finger bar 1 to float, as it were, at about the level of the ground. Instead of the spring 2, a counter-balance weight may be employed for the same purpose.

To the slide box $t$ is also fixed one end of a spring 3, the other end of which is fixed to the bearing $v$ or to a projection carried thereby. This spring 3 has a tendency to turn the inner shoe $y$, finger bar 1, and knife bar $l$ into a vertical position. The finger bar 1 therefore rests lightly or floats on the ground when the machine is working.

The mechanism for raising the knife bar $l$ and parts connected therewith preferably consists of teeth 4 on the back of the slide box $t$, with which gears a toothed quadrant 5, as shown in Figs. 2 and 7. The slide box $t$ is raised by means of the lever 6 attached to the quadrant 7, to which is fixed one end of the chain 8. This latter is attached at its lower end to a lever 9 fixed to, or formed in one with, the toothed quadrant 5.

Owing to the weight of the knife bar $l$, finger bar 1, and parts connected therewith, the bearing $v$ is raised until the projection 10 on the casing $g$ comes into contact with a fixed stop 11 on the sleeve $w$. Then, when the bearing $v$ cannot rise any further, the toothed quadrant 5 begins to rotate the teeth 4 and consequently rotates the knife bar $l$ and parts connected therewith into a more or less vertical position. The foot lever 12 is also connected to the quadrant 7 and may be used to hold the quadrant 7 while the lever 6 is moved forward to engage another part of the quadrant 7. The foot lever 12 may also be used to rotate the quadrant.

Instead of employing the teeth 4 and toothed quadrant 5, I may employ a chain or cable to rotate the slide box $t$, or compound levers may be employed for the same purpose. The lever 13, which operates the rod 14 and lever 15, is employed to rotate the shoe $y$ on its bearings $r$ and thus raise or lower the points of the fingers and knives.

In Figs. 1 and 2 the carrying wheel 16 is shown mounted on a pin carried by a bracket 17 fixed to the bearing $v$, thus allowing the knife bar to be tilted independent of wheel 16 and always to be retained parallel to the ground when mowing.

In Figs. 9 and 10 the wheel 16 is shown, as usual, mounted on a pin carried by the shoe $y$. The shoe $y$ is different to the shoe $y$ shown in Figs. 1 and 2, but is not a novelty. The remaining parts of the mechanism shown in Figs. 9 and 10 are constructed according to the present invention. The knife bar $l$ and the side bar $q$ are connected in such a manner that the knife bar $l$ may move concentrically around the slide bar $q$ and be readily disconnected when necessary.

In Figs. 9 and 10 the latch $s'$ is mounted on the end of the slide bar $q$ so that it may be moved around the axis of this latter. The knife bar $l$ is provided with two lugs $l'$ between which the latch $s'$ engages when in its operative position. A bolt $l^2$ passing through the lugs $l'$ and latch $s'$ retains the latch in position between the lugs $l'$.

In the construction shown in Figs. 1, 3, 7 and 8, the latch $l^3$ is carried by the knife bar $l$ and is moved into and out of position between the lugs $s$, $s$, which are fixed to or formed integral with the enlargement $p$ on the slide bar $q$. The latch $l^3$ is retained between lugs $l^{10}$ shown in Fig. 8 which are somewhat similar to those marked $l'$ shown in Figs. 9 and 10. In the construction shown in Fig. 8 the latch $l^3$ is a plate of metal which is retained in its position between the lugs $l^{10}$ by the spring catch $l^4$.

It will be noticed that in Fig. 2 the rod 18, which is employed to stay the lower end of the bearing $v$, is fixed at its upper end to an eye loose on the sleeve $w$, thus enabling the bearing $v$ and all the mechanism carried by it to rotate around the sleeve $w$ without straining any part.

The knife sections 20, shown separately at Figs. 11, 12 and 13, are formed at their rear ends to pass around the back of the knife bar $l$ and underneath the same. The under part 21 is cut away at one side and projects to a corresponding extent on the other side. The projecting portion passes underneath the next adjacent knife-section, consequently a single rivet passed through one of the holes 22 will hold the adjacent edges of two knife-sections.

What I claim is:—

1. In a mower, the combination of a main axle, a sleeve covering said axle and to which the main frame is attached, an internally toothed gear case mounted on one end of said sleeve, a forwardly and downwardly inclined shaft, means for rotating said shaft, a bearing for said rotating shaft, the upper end of which is supported by said sleeve, an eye mounted on the other end of said sleeve, a rod carried at its upper end by said eye and fixed at its lower end to the lower end of said bearing, and cutting mechanism driven by said rotating shaft, substantially as set forth.

2. In a mower, the combination of a main axle, a sleeve covering said axle and to which the main frame is attached, a forwardly and downwardly inclined shaft, means for rotating said shaft, a bearing for said shaft, the upper end of which is supported by said sleeve, an eye mounted on the other end of said sleeve, a rod carried at its upper end by said eye and fixed at its lower end to the lower end of said bearing, a bracket fixed direct to said bearing, a carrying wheel mounted on said bracket, a shoe pivoted to the lower end of said bearing, and cutting mechanism driven by said shaft, substantially as set forth.

3. In a mower, the combination of a main axle, suitable gearing driven from said axle, a forwardly and downwardly inclined driven shaft, a bearing for said shaft, a sleeve surrounding said bearing, a slide box to the back of which said sleeve is fixed, guides in said slide box, a rod sliding in said guides, a knife bar moved by said rod, and a shoe pivotally mounted on said guides, substantially as set forth.

4. In a mower, the combination of a main axle, suitable gearing, a forwardly and downwardly inclined driven shaft, a bearing for said shaft, a crank pin on said inclined shaft, a block surrounding said crank pin, a slide in which said block moves, a sliding rod carrying said slide, a knife bar mounted to move around the sliding rod, and means for connecting the slide and knife bar, substantially as set forth.

5. In a mower, the combination of a main axle, suitable gearing, a sliding rod driven by said gearing, a knife bar mounted to move around the sliding rod, and a movable latch for connecting the slide and knife bar, said latch being carried by one of these last mentioned parts and engaging the other part, substantially as set forth.

6. In a mower, the combination of a main axle, suitable gearing driven from said axle, a forwardly and downwardly inclined driven shaft, a knife driven by said shaft, a bearing for said shaft, a sleeve surrounding said bearing, a slide box to the back of which said sleeve is fixed, means connected to the slide box for raising the said bearing, a stop to arrest said bearing, which stop causes the slide box to rotate on said bearing and thereby raise the knife bar and parts connected therewith into a vertical position, substantially as set forth.

7. In a mower, the combination of a main axle, suitable gearing driven from said axle, a forwardly and downwardly inclined driven shaft, a bearing for said shaft, a sleeve surrounding said bearing, a slide box to the back of which said sleeve is fixed, a quadrant, means for rotating said quadrant, a chain attached at one end to said quadrant, a lever to which the other end of the chain is attached, a toothed quadrant fixed to said lever, teeth on the back of the slide box gearing with the toothed quadrant, a stop to arrest the motion of the bearing carrying the slide box, and cutting mechanism driven by said shaft, substantially as set forth.

8. In a mower, the combination of a main shaft, a sleeve surrounding said shaft, a gear case pivotally mounted on said sleeve, a forwardly and downwardly inclined driven shaft, a bearing for said shaft carried at its upper end by the said gear case, a finger bar carried by said bearing and a coiled spring surrounding said sleeve, one end being attached to the sleeve and one end being attached to the gear case, said spring tending to raise the lower end of the inclined bearing and parts carried thereby away from the ground, thereby causing the finger parts and parts connected therewith to rest lightly on the ground, substantially as set forth.

9. In a mower, the combination of a main shaft, a forwardly and downwardly inclined driven shaft supported from said main shaft, a bearing for said driven shaft, a sleeve surrounding said bearing, a slide box on the back of which said sleeve is fixed, a finger bar carried by said slide box, and a coiled spring one end of which is attached to said slide box and the other end of which is attached to said bearing and tending to rotate the slide box so that the finger bar rests lightly on the ground, substantially as set forth.

10. In a mower, the combination of a main axle, a sleeve covering said axle and to which the main frame is attached, an internally toothed gear case mounted on one end of said sleeve, a forwardly and downwardly inclined driven shaft, a bearing for said shaft, the upper end of which is supported by said sleeve, an eye, mounted on the other end of said sleeve, a rod carried at its upper end by said eye and fixed at its lower end to the lower end of said bearing, a crank pin on said inclined shaft, a block surrounding said crank pin, a slide in which said block moves, a sliding rod carrying said slide, a knife bar mounted concentrically with respect to the sliding rod, means for connecting the slide and knife bar, and a plurality of knife sections carried by the knife bar each section having a rear portion bent down and returned parallel to the knife fitting behind and underneath the knife bar, said portion being cut away at one side and projecting at its other side beyond the knife to a similar extent to the cut away portion, a hole in the knife and a hole in the projecting portion to receive a rivet, substantially as set forth.

In witness whereof I have hereunto set my hand in presence of two witnesses.

W. E. MARTIN.

Witnesses:
Wm. Girling,
Claude K. Mill.

Copies of this patent may be obtained for five cents each, by addressing the "Commissioner of Patents, Washington, D. C."